United States Patent
Bai et al.

(10) Patent No.: US 9,929,585 B2
(45) Date of Patent: Mar. 27, 2018

(54) POWER TRANSFER SYSTEM

(71) Applicant: KETTERING UNIVERSITY, Flint, MI (US)

(72) Inventors: Hua Bai, Flint, MI (US); Xuan Zhou, Novi, MI (US)

(73) Assignee: KETTERING UNIVERSITY, Flint, MI (US)

( * ) Notice: Subject to any disclaimer, the term of this patent is extended or adjusted under 35 U.S.C. 154(b) by 238 days.

(21) Appl. No.: 14/844,275

(22) Filed: Sep. 3, 2015

(65) Prior Publication Data
US 2016/0064949 A1     Mar. 3, 2016

Related U.S. Application Data

(60) Provisional application No. 62/045,087, filed on Sep. 3, 2014.

(51) Int. Cl.
| | |
|---|---|
| *H01F 37/00* | (2006.01) |
| *H02J 7/02* | (2016.01) |
| *H02J 17/00* | (2006.01) |
| *H02J 50/12* | (2016.01) |

(52) U.S. Cl.
CPC ............ *H02J 7/025* (2013.01); *H02J 17/00* (2013.01); *H02J 50/12* (2016.02)

(58) Field of Classification Search
None
See application file for complete search history.

(56) References Cited

U.S. PATENT DOCUMENTS

| | | | |
|---|---|---|---|
| 5,461,297 A | 10/1995 | Crawford | |
| 5,573,090 A | 11/1996 | Ross | |
| 5,940,280 A * | 8/1999 | Murai | H02J 7/022 363/132 |
| 7,038,272 B2 * | 5/2006 | Weber | H01L 29/0634 257/256 |
| 8,467,201 B2 | 6/2013 | Berghegger | |

(Continued)

OTHER PUBLICATIONS

Jauch et al., "Single-Phase Single-Stage Bidirectional Isolated ZVS AC-DC Converter with PFC", 15th International Power Electronics and Motion Control Conference, EPE-PEMC 2012 ECCE Europe, Novi Sad, Serbia.*

(Continued)

*Primary Examiner* — Long Nguyen
(74) *Attorney, Agent, or Firm* — Dickinson Wright PLLC

(57) ABSTRACT

A power transfer system and method are provided for transferring power from an AC supply outputting a first AC voltage. The system includes a controller and a matrix converter coupled to the AC supply for converting the first AC voltage to a second AC voltage. A primary coil is connected to the matrix converter and a secondary coil is in communication with the primary coil for producing an induced AC voltage. A secondary rectifier is connected to the secondary coil for rectifying the induced AC voltage to produce a secondary DC voltage. A sensor is coupled to the secondary rectifier and to the controller for monitoring the secondary DC voltage and outputting a proportional signal. The controller is configured to control the matrix converter producing a desired second AC voltage at a desired operating frequency and maintain a predetermined secondary DC voltage in response to the signal from the sensor.

17 Claims, 4 Drawing Sheets

(56) References Cited

U.S. PATENT DOCUMENTS

2013/0207482 A1 8/2013 Madawala et al.
2014/0125140 A1 5/2014 Widmer et al.
2016/0001662 A1* 1/2016 Miller .................. B60L 11/005
　　　　　　　　　　　　　　　　　　　　　307/104

OTHER PUBLICATIONS

F. Jauch et al., "Single-Phase Single-Stage Bidriectional Isolated ZVS AC-DC Converter with PFC", 15th International Power Electronics and Motion Control Conference, EPE-PEMC 2012 ECCE Europe, Novi Sad, Serbia.
C. Jiang et al., "Design of a Zero-Voltage Switching Large-Air Gap Wireless Charger with Low Electrical Stress for Plug-in Electric Vehicles", IET Power Electronics, vol. 6, No. 9, 2013, pp. 1742-1750.
M. Imayavaramban et al., "Analysis of Different Schemes of Matrix Converter with Maximum Voltage Conversion Ratio", MELECON, 2004, pp. 1137-1140.

* cited by examiner

POWER TRANSFER SYSTEM

CROSS REFERENCE TO RELATED APPLICATIONS

This application claims the benefit of and priority to U.S. Provisional Application Ser. No. 62/045,087 filed Sep. 3, 2014, which is incorporated herein by reference in its entirety.

BACKGROUND OF THE INVENTION

1. Field of the Invention

The present disclosure relates generally to a power transfer system and in particular, a power transfer system for electric vehicles and other related power transfer applications.

2. Related Art

Electronic devices such as laptops, cell phones, smart phones, smart devices, smart watches, tablets, MP3 players, digital media players generally require batteries and in some cases employ wireless power transfer (WPT) systems in order to charge the batteries of the devices. Charging systems for electric and/or hybrid vehicles may also utilize wireless power transfer (WPT) systems. Given the increasing demand for hybrid and electric vehicles as well as increased use of electronic devices, automotive companies and electronic device manufacturers are each motivated to design and manufacture improved high power WPT systems for vehicles and non-vehicle electronic devices respectively.

Many WPT systems utilize a topology involving the resonance or transfer of energy between two coils forming a transformer, with one coil acting as a power transmitter (i.e. primary coil) and the other acting as the receiver (i.e. secondary coil). The two coils may for example have a large air gap (e.g. greater than 10 centimeters). At least one capacitor can also be used in parallel and/or series with each of the two coils to enhance the electromagnetic field link between the two coils and allow highly effective power transfer. An alternating current (AC) voltage is generally supplied to the primary coil which induces an alternating voltage in the secondary coil. The induced voltage in the secondary coil is used to charge the battery of the vehicle or electronic device.

Power transfer systems may use electronic switches (e.g. transistors) that are periodically switched on and off at a switching frequency to produce a necessary AC voltage to be supplied to the primary coil. However, many known solutions are sensitive to the switching frequency. In other words, small variations in the switching frequency can cause a large change in the amount of voltage induced in the secondary coil and applied to the battery (i.e. charging voltage). In order to adjust the amount of induced voltage in the secondary coil, the switching frequency may be adjusted. Other problems arise when the switching frequency is adjusted in this manner. For example, as switching frequency increases, the system's overall efficiency decreases due to high switching loss. Existing engineering standards such as SAE J-2954 may also require wireless chargers to operate at specific frequencies. Known power transfer systems may also be limited in their overall efficiency. As such, there is an increasing need for power transfer systems which address the problems of known systems.

SUMMARY AND ADVANTAGES OF THE INVENTION

This section provides a general summary of the present disclosure and is not intended to be interpreted as a comprehensive disclosure of its full scope or all of its features, aspects, and objectives. Accordingly, the aspects of the present disclosure provide a power transfer system for transferring power to a battery of an electric device and a method of transferring power utilizing the power transfer system.

It is an aspect of the present disclosure to provide a power transfer system for transferring power from an AC supply outputting a first AC voltage and including a controller. A matrix converter has a positive primary coil node and a negative primary coil node and defines a first primary node and a second primary node and is coupled to the AC supply for converting the first AC voltage to a second AC voltage. A primary coil is connected between the positive primary coil node and the negative primary coil node of the matrix converter for producing an alternating magnetic field in response to receiving the second AC voltage from the matrix converter. A secondary coil is in communication with the primary coil for producing an induced AC voltage in response to receiving the alternating magnetic field from the primary coil. A secondary rectifier is connected to the secondary coil for rectifying the induced AC voltage from the secondary coil to produce a secondary DC voltage. The matrix converter includes a first bidirectional switching module that is coupled to the controller and connected between the first primary node and the positive primary coil node. Similarly, a second bidirectional switching module is coupled to the controller and is connected between the positive primary coil node and the second primary node. The controller is configured to control the first bidirectional switching module and the second bidirectional switching module of the matrix converter to produce the second AC voltage at a desired level and at a desired output operating frequency and maintain the secondary DC voltage at a predetermined level. The secondary rectifier is of the voltage doubling type and has a positive secondary coil node and a negative secondary coil node. The secondary rectifier defines a first secondary node and a second secondary node and includes a first rectifier diode coupled to the secondary coil and connected to the first secondary node and a second rectifier diode connected to the second secondary node and coupled to the secondary coil at the positive secondary coil node. The secondary rectifier also includes a first rectifier capacitor connected between the first secondary node and the negative secondary coil node and a second rectifier capacitor connected between the negative secondary coil node and the second secondary node for rectifying and doubling the induced AC voltage from the secondary coil to produce the secondary DC voltage. A first primary coil tuning capacitor is connected between the first primary node and the negative primary coil node. A second primary coil tuning capacitor is connected between the second primary node and the negative primary coil node. A secondary coil tuning capacitor is connected between the secondary coil and the positive secondary coil node for tuning resonance between the primary coil and the secondary coil.

It is another aspect of the present disclosure to provide a power transfer system for transferring power from an AC supply outputting a first AC voltage including a controller. A filter is connected to the AC supply for filtering out undesirable frequencies from the first AC voltage supplied by the AC supply. A matrix converter, which is a half bridge type matrix converter, is connected to the filter for converting the first AC voltage to a second AC voltage. A primary coil is connected to the matrix converter for producing an alternating magnetic field in response to receiving the second AC voltage from the matrix converter. A secondary coil is in communication with the primary coil for producing an induced AC voltage in response to receiving the alternating magnetic field from the primary coil. A secondary rectifier, that is a voltage doubling type of rectifier, is connected to the secondary coil for rectifying the induced AC voltage from the secondary coil to produce a secondary DC voltage. At least one sensor is coupled to the secondary rectifier and in communication with the controller for monitoring the secondary DC voltage from the secondary rectifier and outputting a proportional signal. The controller is configured to control the matrix converter to produce the second AC voltage at a desired level and at a desired operating frequency and maintain the secondary DC voltage at a predetermined level in response to the signal from the sensor.

It is another aspect of the present disclosure to provide a method of power transfer including the step of supplying a first AC voltage with an AC supply. The method continues with switching at least one matrix converter switch of a matrix converter at a predetermined switching frequency with a controller and converting the first AC voltage to a second AC voltage at a desired operating frequency with the matrix converter. Next, supplying the second AC voltage to a primary coil. Then the method includes the step of producing an alternating magnetic field in response to the second AC voltage with the primary coil. The method continues by producing an induced AC voltage in a secondary coil in response to the alternating field from the primary coil. The method proceeds with converting the induced AC voltage to a secondary DC voltage with a secondary rectifier. The next step of the method is measuring the secondary DC voltage with a sensor using the controller. The method concludes with varying the second AC voltage using the controller in response to a signal from the sensor and varying the secondary DC voltage.

The aspects of the present disclosure may provide various advantages. For example, the power transfer system is able to operate at a constant operating frequency. Consequently, the induced voltage in the secondary coil (i.e. charging voltage) may be accurately controlled. Additionally, because of the constant switching frequency, the power transfer system's overall efficiency may be maintained with minimal switching loss. As a result, the power transfer system may operate with a high efficiency at a specific frequency required by existing engineering standards such as Society of Automotive Engineers (SAE) J-2954.

These and other aspects and areas of applicability will become apparent from the description provided herein. The description and specific examples in this summary are intended for purpose of illustration only and are not intended to limit the scope of the present disclosure

BRIEF DESCRIPTION OF THE DRAWINGS

The drawings described herein are for illustrative purposes only of selected embodiments and not all implementations, and are not intended to limit the present disclosure to only that actually shown. With this in mind, various features and advantages of example embodiments of the present disclosure will become apparent from the following written description when considered in combination with the appended drawings, in which.

DESCRIPTION OF THE ENABLING EMBODIMENTS

Detailed examples of the present disclosure are provided herein; however, it is to be understood that the disclosed examples are merely exemplary and may be embodied in various and alternative forms. It is not intended that these examples illustrate and describe all possible forms of the disclosure. Rather, the words used in the specification are words of description rather than limitation, and it is understood that various changes may be made without departing from the spirit and scope of the disclosure.

The aspects of the power transfer system disclosed herein may provide a controller configured to vary a second alternating current (AC) voltage produced from a first voltage from an AC supply to adjust the charging power of the system based on the system's needs at the time. Specifically, based on a direct current (DC) battery voltage and/or current detected by at least one sensor.

As those of ordinary skill in the art will understand, various features of the present disclosure as illustrated and described with reference to any of the Figures may be combined with features illustrated in one or more other Figures to produce examples of the present disclosure that are not explicitly illustrated or described. The combinations of features illustrated provide representative examples for typical applications. However, various combinations and modifications of the features consistent with the teachings of the present disclosure may be desired for particular applications or implementations.

Figure 1:
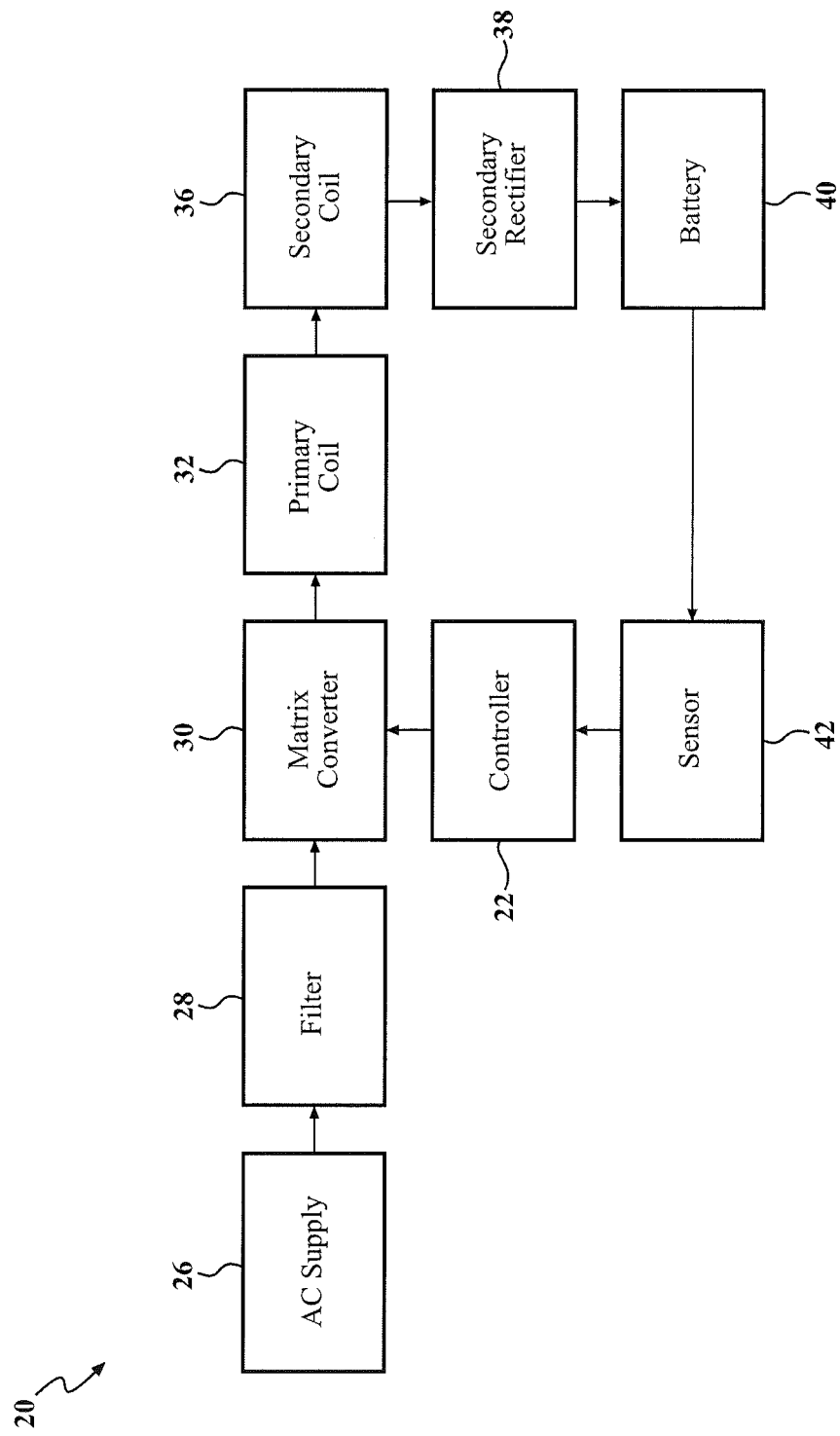
FIG. 1 is a block diagram of a power transfer system in accordance with the present disclosure.
Figure 2:
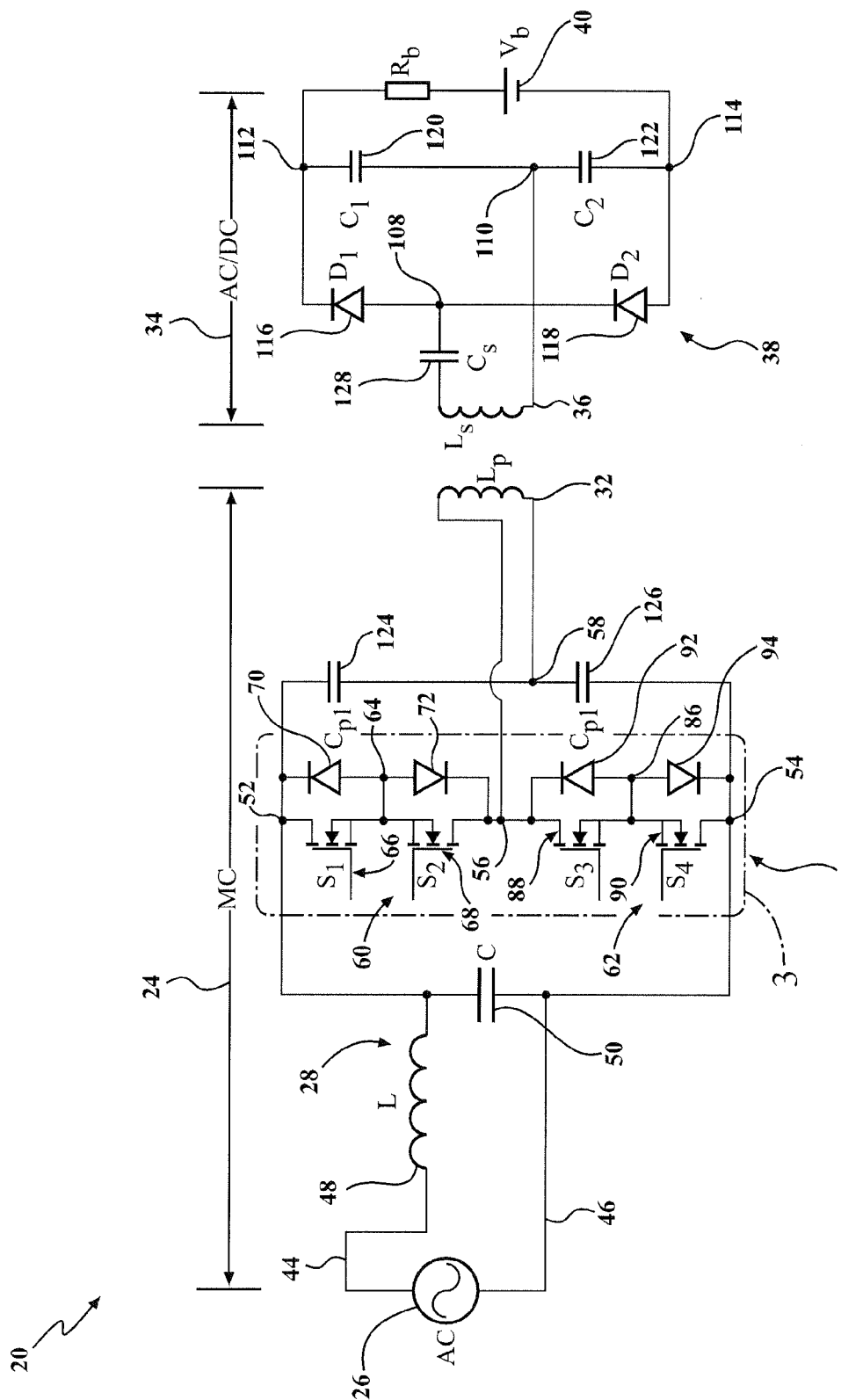
FIG. 2 is a circuit diagram of a circuit of a power transfer system in accordance with the present disclosure.

FIG. 1 illustrates a block diagram of a power transfer system 20 in accordance with the present disclosure. FIG. 2 illustrates a corresponding circuit diagram of the power transfer system 20 in accordance with the present disclosure. The power transfer system 20 includes a controller 22 may be known as a two stage system which can be broken down into two parts: 1) a matrix converter (MC) or AC/AC portion 24 which may include an AC supply 26, a filter 28, a matrix converter 30, and a primary coil 32, and 2) an AC/DC portion 34 which may include a secondary coil 36, a secondary rectifier 38, a battery 40, and at least one sensor 42 (FIG. 1).

The AC supply 26, also known as an alternating current input, has a positive supply node 44 and a negative supply node 46 for providing a first AC voltage across the positive supply node 44 and the negative supply node 46. The AC voltage may be produced by a power supply or by a control device having a power system. The filter 28 is connected to the AC supply 26 for filtering out or removing unwanted and undesirable frequencies from the AC voltage supplied by the AC supply 26. In one aspect of the power transfer system 20, the filter 28 is of the passive type and includes a filter inductor 48 connected between the positive supply node 44 and the matrix converter 30. The filter 28 may also include a filter capacitor 50 connected in parallel with the matrix converter 30. In another aspect, the filter 28 is a passive filter 28 utilizing a filter inductor 48 only (not shown). It should be understood that the filter 28 may be another type of filter such as, but not limited a high pass filter, a low pass filter, a band pass filter, or no filter at all. Each type of filter 28 may remove a respective range of frequencies.

The matrix converter 30 (i.e. AC-to-AC converter) is connected to the filter 28 and defines a first primary node 52 and a second primary node 54 and has a positive primary coil node 56 and a negative primary coil node 58 for converting the first AC voltage to a second AC voltage. In the event that no filter 28 is utilized, the matrix converter 30 is directly connected to the positive supply node 44 and negative supply node 46 of the AC supply 26. The matrix converter 30 includes a first bidirectional switching module 60 that is coupled to the controller 22 and connected between the first primary node 52 and the positive primary coil node 56. Similarly, a second bidirectional switching module 62 is coupled to the controller 22 and is connected between the positive primary coil node 56 and the second primary node 54. Although the matrix converter 30 may be a half-bridge type converter, it should be appreciated that a full-bridge matrix converter, for example, may be utilized instead.

Figure 3:
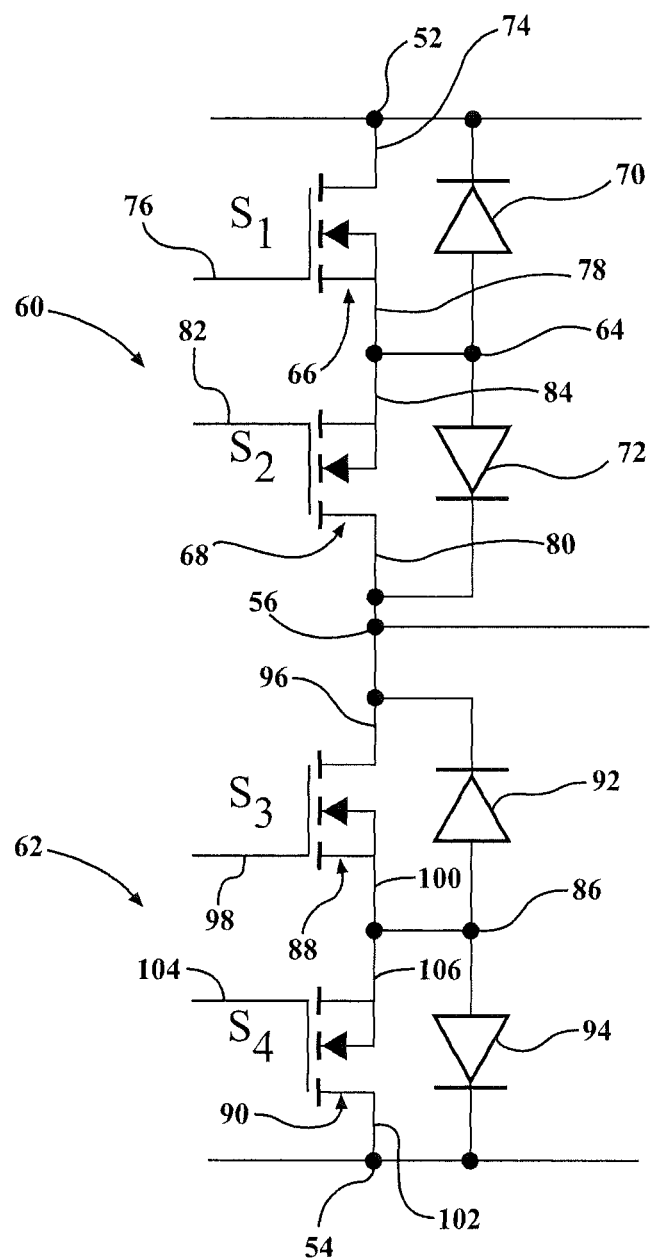
FIG. 3 is an enlarged partial view of the circuit diagram of FIG. 2.

As best shown in FIG. 3, the first bidirectional switching module 60 defines a first intermediate node 64 and has a first converter switch 66 coupled to the controller 22 and connected between the first primary node 52 and the first intermediate node 64. The first bidirectional switching module 60 also includes a second converter switch 68 coupled to the controller 22 and connected between the positive primary coil node 56 and the first intermediate node 64. A first flyback diode 70 is connected between the first intermediate node 64 and the first primary node 52 for preventing voltage spikes across the first converter switch 66. A second flyback diode 72 is connected between the first intermediate node 64 and the positive primary coil node 56 for preventing voltage spikes across the second converter switch 68. According to an aspect, the first converter switch 66 is a field-effect transistor (FET) having a first drain 74 connected to the first primary node 52 and a first gate 76 coupled to the controller 22 and a first source 78 connected to the first intermediate node 64. Similarly, the second converter switch 68 may be a field-effect transistor that has a second drain 80 connected to the positive primary coil node 56 and a second gate 82 coupled to the controller 22 and a second source 84 connected to the first source 78 of the first converter switch 66 at the first intermediate node 64.

The second bidirectional switching module 62 defines a second intermediate node 86 and has a third converter switch 88 connected between the positive primary coil node 56 and the second intermediate node 86. The second bidirectional switching module 62 also includes a fourth converter switch 90 connected between the second primary node 54 and the second intermediate node 86. A third flyback diode 92 is connected between the second intermediate node 86 and the positive primary coil node 56 for preventing voltage spikes across the third converter switch 88. A fourth flyback diode 94 is connected between the second intermediate node 86 and the second primary node 54 for preventing voltage spikes across the fourth converter switch 90. According to an aspect, the third converter switch 88 is a field-effect transistor that has a third drain 96 connected to the positive primary coil node 56 and a third gate 98 coupled to the controller 22 and a third source 100 connected to the second intermediate node 86. Similarly, the fourth converter switch 90 is a field-effect transistor that has a fourth drain 102 connected to the second primary node 54 and a fourth gate 104 coupled to the controller 22 and a fourth source 106 connected to the third source 100 of the third converter switch 88 at the second intermediate node 86.

The current lack of availability of bidirectional switches requires that presently existing switches 66, 68, 88, 90 are connected back-to-back in pairs, as illustrated in FIG. 3, for example. However, it should be appreciated that a bidirectional switch could instead comprise each of the bidirectional switching modules 60, 62. In other words, only two bidirectional switches could be used instead of the four converter switches 66, 68, 88, 90 as disclosed herein. The use of bidirectional switches could also simplify a control algorithm used by the controller 22 to control the matrix converter 30.

According to an aspect, the converter switches 66, 68, 88, 90 are all metal-oxide-semiconductor field-effect transistors (MOSFET). However, it should be appreciated that one or more of the converter switches 66, 68, 88, 90 may be another type of switch such as, but not limited to another type of FET, or a bipolar junction transistor (BJT). However, a MOSFET capable of zero-voltage switching (ZVS), such as, but not limited to an N-channel CoolMOS™ MOSFET manufactured by Infineon Technologies is preferred in order to achieve high efficiency. According to an aspect of the disclosure, the use of a MOSFET capable of ZVS, such as, but not limited to the N-channel CoolMOS™ MOSFET for each of the converter switches 66, 68, 88, 90 advantageously allows the matrix converter 30 to reach approximately 98% efficiency.

The matrix converter 30, as disclosed, has advantages over traditional rectifier-inverter type power frequency converters. The matrix converter 30 provides sinusoidal input and output waveforms, with minimal higher-order harmonics and no sub-harmonics. It is also capable of bidirectional energy flow and the input power factor can be fully controlled. Lastly, the matrix converter 30 has minimal energy storage requirements. Consequently, fewer bulky and life-time-limited capacitors are required. The matrix converter 30 can also, for example, convert the 60 Hz grid AC voltage (e.g. from the AC supply 26) to a high-frequency AC waveform, reducing the number of stages of the power transfer system 20 as compared to prior art systems.

Referring back to FIG. 2, the primary coil 32 of the power transfer system 20 is connected between the positive primary coil node 56 and the negative primary coil node 58 of the matrix converter 30 for producing an alternating magnetic field in response to receiving the second AC voltage from the matrix converter 30. The secondary coil 36 of the power transfer system 20 is in communication with the primary coil 32 for producing an AC induced voltage in response to the alternating magnetic field from the primary coil 32. In other words, the primary coil 32 may be considered a transmitter and the secondary coil 36 may be considered a receiver. It should be appreciated by one skilled in the art that the primary coil 32 may transfer energy between the primary coil 32 and the secondary coil 36 through electromagnetic induction. Additionally, the primary coil 32 and the secondary coil 36 may be used to realize electrical isolation. For example, the secondary coil 36 may be spaced from the primary coil 32 a distance greater than 10 centimeters (cm). According to an aspect, the coils 32, 36 may also utilize Litz wire for decreasing copper losses to allow the efficiency of the coils 32, 36 to reach 99%.

The secondary rectifier 38 (i.e. AC-to-DC converter) has a positive secondary coil node 108 and a negative secondary coil node 110 and defines a first secondary node 112 and a second secondary node 114. According to an aspect of the disclosure, the secondary rectifier 38 is a voltage doubling type of rectifier. However, it should be understood that the secondary rectifier 38 may instead be another type of AC-to-DC converter such as, but not limited to a full-bridge rectifier. The secondary rectifier 38 includes a first rectifier diode 116 that is coupled to the secondary coil 36 at the positive secondary coil node 108 and connected to the first secondary node 112. A second rectifier diode 118 is connected to the second secondary node 114 and is coupled to the secondary coil 36 at the positive secondary coil node 108. The use of only two rectifier diodes 116, 118 in the secondary rectifier 38 advantageously decreases efficiency losses. Additionally, the rectifier diodes 116, 118 are softly turned off (i.e. no reverse recovery loss), which results in approximately 99% efficiency for the secondary rectifier 38 disclosed herein. A first rectifier capacitor 120 is connected between the first secondary node 112 and the negative secondary coil node 110. Similarly, a second rectifier capacitor 122 is connected between the negative secondary coil node 110 and the second secondary node 114. The rectifier diodes 116, 118 and rectifier capacitors 120, 122 connected in this arrangement provides for a rectification and doubling of the induced AC voltage from the secondary coil 36 to produce the secondary DC voltage.

The power transfer system 20 further includes a first primary coil tuning capacitor 124 connected between the first primary node 52 and the negative primary coil node 58. Similarly, a second primary coil tuning capacitor 126 is connected between the second primary node 54 and the negative primary coil node 58. A secondary coil tuning capacitor 128 is connected between the secondary coil 36 and the positive secondary coil node 108. Generally, coil tuning capacitors 124, 126, 128 are added to the power transfer system 20 in order to "tune" the primary coil 32 and the secondary coil 36 to provide resonance between the coils 32, 36 and increased efficiency of the power transfer system 20. In other words, the coils 32, 36, primary coil tuning capacitors 124, 126, and secondary coil tuning capacitor 128 form a resonance network. According to an aspect, the primary coil tuning capacitors 124, 126 (e.g. on the grid side) each have a capacitance of~microfarads (e.g. film capacitor). However, it should be understood that the capacitance of the coil tuning capacitors 124, 126, 128 may be selected depending, for example, on the characteristics of the coils 32, 36. It should also be appreciated that the power transfer system 20 may include any number of coil tuning capacitors 124, 126, 128 (including zero), in series or in parallel with the primary coil 32 and/or secondary coil 36. If, for example, no secondary coil tuning capacitor 128 is utilized, the first rectifier diode 116 would instead be directly connected to the secondary coil 36 at the positive secondary coil node 108 and to the first secondary node 112. Similarly, the second rectifier diode 118 would instead be directly connected to the secondary coil 36 at the positive secondary coil node 108 and to the second secondary node 114.

The battery 40 is connected between the first secondary node 112 and the second secondary node 114 for storing the secondary DC voltage from the secondary rectifier 38. The battery 40 may have an internal resistance represented by $R_b$ (FIG. 2). According to an aspect of the disclosure, the at least one sensor 42 (FIG. 1) is connected to the battery 40 and is coupled with the controller 22 for monitoring the secondary DC voltage at the battery 40 and outputs a signal proportional to a magnitude of the secondary DC voltage. The battery 40 may be responsible for powering an electric device. In an aspect of the present disclosure, the electric device may be any type of electrical device such as, but not limited to an electric vehicle, a computer, a laptop, a smart phone, a cell phone, a smart watch, smart glasses, a smart device, a tablet, a MP3 player, or a digital media player. The battery 40 may receive and store the energy transferred from the primary coil 32 to the secondary coil 36 and through the secondary rectifier 38 to be used for the electric device.

According to an aspect of the disclosure, the at least one sensor 42 (FIG. 1) may communicate with the controller 22 wirelessly. For example, the controller 22, matrix converter 30, and primary coil 32 may be part of a "charger" and the secondary coil 36, secondary rectifier 38, battery 40, and at least one sensor 42 may part of the device or vehicle portion of the power transfer system 20 that may be remote from the "charger". In such an arrangement, the signal of the sensor 42 is preferably communicated wirelessly since the device or vehicle may be not wired to the "charger". However, it should be appreciated that the at least one sensor 42 can be coupled with the controller 22 in any manner including being coupled via a wire. Additionally, it should be understood that there may also be other sensors 42 coupled to other parts of the power transfer system 20 such as, but not limited to the matrix converter 30 and/or the primary coil 32.

The controller 22 may be configured to receive the signal from the at least one sensor 42, such as measurements relating to the voltage and/or the current at the battery 40. Referring back to FIG. 1, the controller 22 may be in communication with the matrix converter 30 and as such, may control the converter switches 66, 68, 88, 90 of the matrix converter 30 based on the signal from the at least one sensor 42.

In operation, the controller 22 is configured to control the converter switches 66, 68, 88, 90 to produce a desired secondary DC voltage in response to the signal from the sensor 42. The output of the matrix converter 30 is a second AC voltage that may be varied to achieve the secondary DC voltage necessary to charge the battery 40. In other words, by controlling the converter switches 66, 68, 88, 90 of the matrix converter 30, the second AC voltage may be adjusted and in turn, the secondary DC voltage at the battery 40 is varied as a result based on the input received from the at least one sensor 42. By sampling the voltage and/or current, the controller 22 may determine higher or lower power is needed to charge the electric device. Consequently, the controller 22 may increase or decrease the duty cycle in operating the converter switches 66, 68, 88, 90 of the matrix converter 30. Increasing or decreasing the duty cycle of the converter switches 66, 68, 88, 90 produces a variable second AC voltage. For instance, if the at least one sensor 42 detects a low secondary DC voltage, the second AC voltage may be increased to produce an increased secondary DC voltage (i.e. a higher charging power).

As described in the prior art, power transfer systems 20 typically produce a varying output power by varying the operating frequency which may cause issues with or have an adverse effect on system efficiency. Many known wireless charging systems, for example, are limited to approximately 94% maximum efficiency. In contrast, the power transfer system 20 shown in FIGS. 1-3 utilizes the controller 22 to vary the second AC voltage of the circuitry based the sensor 42 signal. In order to achieve this, the controller 22 is configured to control the converter switches 66, 68, 88, 90 of the matrix converter 30 at a predetermined switching frequency to create the second AC voltage of the matrix converter 30 at a desired operating frequency. For example, the desired operating frequency may be chosen from a specific range (e.g. 70-100 kHz) such as 80 kHz as required by wireless charging specifications including J-2954 promulgated by the Society of Automotive Engineers (SAE). In any event, the switching frequency of the matrix converter 30 is intended to remain constant as the second AC voltage is varied. The overall efficiency of the power transfer system 20 disclosed herein is approximately 96%.

Figure 4:
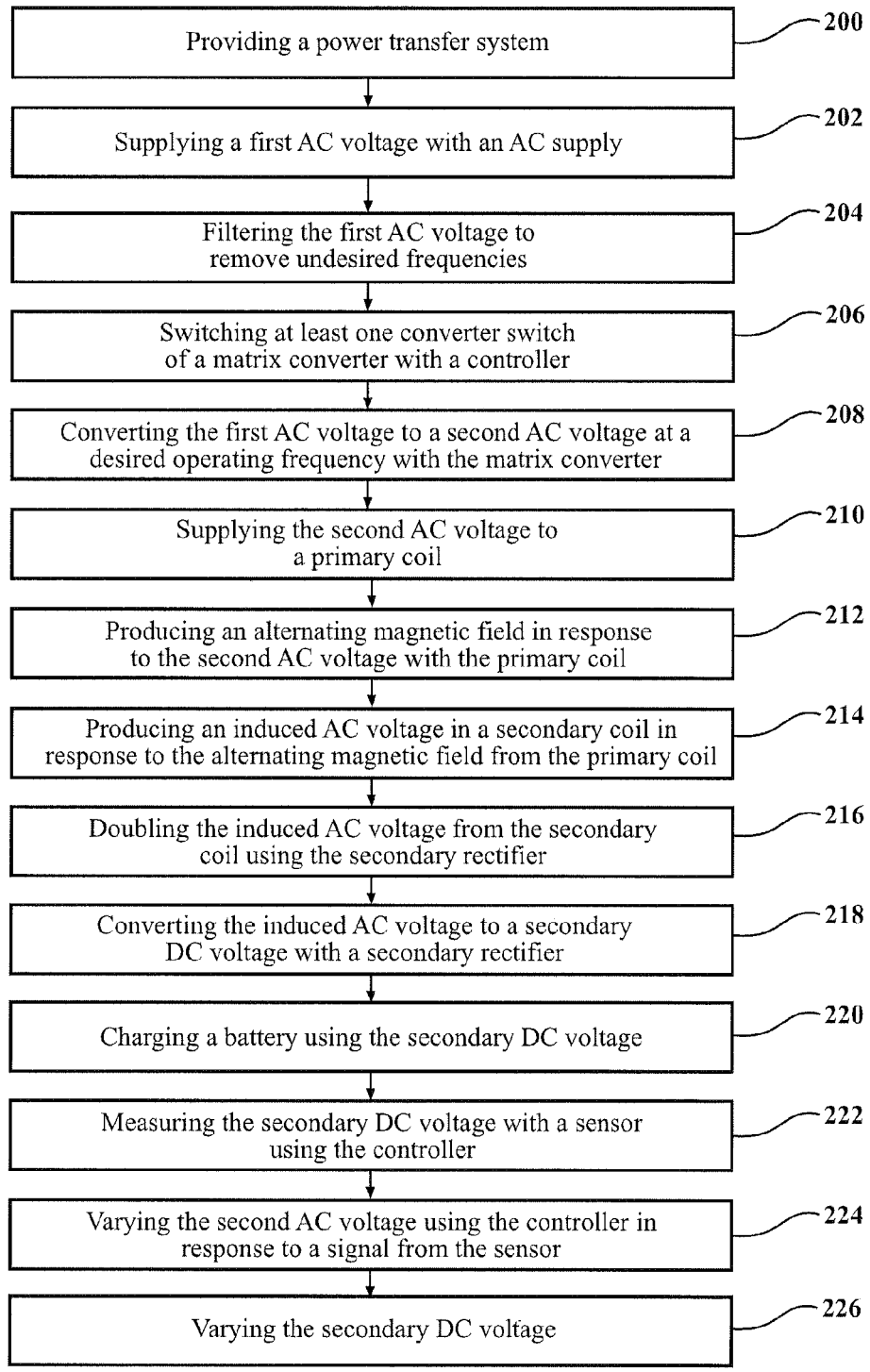
FIG. 4 is a flowchart of a method for a power transfer system in accordance with the present disclosure.

FIG. 4 is a flowchart of a method for operating a power transfer system 20 in accordance with the present disclosure. The method may include 200 providing a power transfer system 20 as described above. The method may include the step of 202 supplying a first AC voltage with an AC supply 26. The AC supply 26 may be a power supply or a device controller 22 having a power supply. The method may also include the step of 204 filtering the first AC voltage to remove undesired frequencies. It should be understood that the method may be alternatively carried out without filtering. The method proceeds with the steps of 206 switching at least one converter switch 66, 68, 88, 90 of a matrix converter 30 (i.e. AC/AC converter) at a predetermined switching frequency with a controller 22 and 208 converting the first AC voltage to a second AC voltage at a desired operating frequency with the matrix converter 30. Next, 210 supplying the primary AC voltage to a primary coil 32 and 212 producing an alternating magnetic field in response to the primary AC voltage with the primary coil 32. The next step is 214 producing an induced AC voltage in a secondary coil 36 in response to the alternating magnetic field from the primary coil 32. The method continues by 216 doubling the induced AC voltage from the secondary coil 36 using the secondary rectifier 38 and 218 converting the induced AC voltage to a secondary DC voltage with a secondary rectifier 38 (i.e. AC/DC converter). The method then includes the step of 220 charging a battery 40 using the secondary DC voltage. The method may also include 222 measuring the secondary DC voltage with a sensor 42 using the controller 22. It should be understood that the sensor 42 may instead be configured to measure current rather than voltage or the charging system may also include multiple sensors 42. The method concludes by 224 varying the second AC voltage using the controller 22 in response to a signal from the sensor 42 and 226 varying the secondary DC voltage. In other words, the controller 22 may be in electrical communication with the at least one sensor 42 (e.g. wirelessly) and may vary the second AC voltage voltage to adjust the charging power output of the power transfer system to charge the battery 40 based on the secondary DC voltage at the battery 40 detected by the sensor 42.

It should also be appreciated that the power transfer system 20 described herein is not limited to wireless charging or wireless power transfer applications. The power transfer system 20 disclosed may also be used for other applications such as, but not limited to inductive heating, as an isolated DC/DC converter, as a conventional battery charger, or power electronics converters requiring high efficiency. In the case of the conventional battery charger, it should be understood that the primary coil 32 in communication with the secondary coil 36 comprises a transformer. Therefore, the power transfer system 20 could alternatively be used in a conventional battery charging or power transfer application in which the electric device (e.g. electric vehicle, electronic device, etc.) is being charged via a wired connection. Any gap or spacing between the primary coil 32 and secondary coil 36 in such an application would provide desirable isolation, for example.

While examples of the disclosure have been illustrated and described, it is not intended that these examples illustrate and describe all possible forms of the disclosure. Rather, the words used in the specification are words of description rather than limitation, and it is understood that various changes may be made without departing from the spirit and scope of the disclosure. Additionally, the features and various implementing embodiments may be combined to form further examples of the disclosure.

The foregoing description is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Those skilled in the art will recognize that the inventive concept disclosed in association with an example power transfer system 20 can likewise be implemented into many other electrical systems. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

What is claimed is:

1. A power transfer system for transferring power from an AC supply outputting a first AC voltage comprising;
   a controller,
   a matrix converter having a positive primary coil node and a negative primary coil node and defining a first primary node and a second primary node and coupled to the AC supply for converting the first AC voltage to a second AC voltage,
   a primary coil connected between said positive primary coil node and said negative primary coil node of said matrix converter for producing an alternating magnetic field in response to receiving the second AC voltage from said matrix converter,
   a secondary coil in communication with said primary coil for producing an induced AC voltage in response to receiving the alternating magnetic field from said primary coil,
   a secondary rectifier connected to said secondary coil for rectifying the induced AC voltage from said secondary coil to produce a secondary DC voltage,
   characterized by
   said matrix converter including a first bidirectional switching module coupled to said controller and connected between said first primary node and said positive primary coil node and a second bidirectional switching module coupled to said controller and connected between said positive primary coil node and said second primary node,
   said controller configured to control said first bidirectional switching module and said second bidirectional switching module of said matrix converter to produce the second AC voltage at a desired level and at a desired output operating frequency and maintain the secondary DC voltage at a predetermined level,
   said secondary rectifier being of the voltage doubling type and having a positive secondary coil node and a negative secondary coil node and defining a first secondary node and a second secondary node and including a first rectifier diode coupled to said secondary coil and connected to said first secondary node and a second rectifier diode connected to said second secondary node and coupled to said secondary coil at said positive secondary coil node and including a first rectifier capacitor connected between said first secondary node and said negative secondary coil node and a second rectifier capacitor connected between said negative secondary coil node and said second secondary node for rectifying and doubling the induced AC voltage from the secondary coil to produce the secondary DC voltage, and
   a first primary coil tuning capacitor connected between said first primary node and said negative primary coil node and a second primary coil tuning capacitor connected between said second primary node and said negative primary coil node and a secondary coil tuning capacitor connected between said secondary coil and said positive secondary coil node for tuning resonance between said primary coil and said secondary coil.

2. A power transfer system as set forth in claim 1 wherein said first bidirectional switching module defines a first intermediate node and has a first converter switch coupled to said controller and connected between said first primary node and said first intermediate node and a second converter switch coupled to said controller and connected between said positive primary coil node and said first intermediate node and said second bidirectional switching module defines a second intermediate node and has a third converter switch connected between said positive primary coil node and said second intermediate node and a fourth converter switch connected between said second primary node and said second intermediate node and said controller configured to control said converter switches at a predetermined switching frequency to convert the first AC voltage to the second AC voltage at the desired operating frequency.

3. A power transfer system as set forth in claim 2 wherein said desired operating frequency is between 70 and 100 kHz.

4. A power transfer system as set forth in claim 2 wherein said first converter switch is a field-effect transistor having a first drain connected to said first primary node and a first gate coupled to said controller and a first source connected to said first intermediate node and said second converter switch is a field-effect transistor having a second drain connected to said positive primary coil node and a second gate coupled to said controller and a second source connected to said first source of said first converter switch at said first intermediate node and said third converter switch is a field-effect transistor having a third drain connected to said positive primary coil node and a third gate coupled to said controller and a third source connected to said second intermediate node and said fourth converter switch being a field-effect transistor having a fourth drain connected to said second primary node and a fourth gate coupled to said controller and a fourth source connected to said third source of said third converter switch at said second intermediate node.

5. A power transfer system as set forth in claim 4 wherein said field-effect transistors are of the N-Channel CoolMOS type.

6. A power transfer system as set forth in claim 1 further including a battery connected to said secondary rectifier between said first secondary node and said second secondary node for storing the secondary DC voltage from the secondary rectifier.

7. A power transfer system as set forth in claim 6 further including at least one sensor connected to said battery and in communication with said controller for monitoring the secondary DC voltage at said battery and outputting a signal proportional to the secondary DC voltage and wherein said controller is configured to control said matrix converter to produce a desired second AC voltage at a desired operating frequency and maintain a predetermined secondary DC voltage in response to the signal from said sensor.

8. A power transfer system for transferring power from an AC supply outputting a first AC voltage comprising;
   a controller, a filter connected to the AC supply for filtering out undesirable frequencies from the first AC voltage supplied by the AC supply, a matrix converter of the half bridge type connected to said filter for converting the first AC voltage to a second AC voltage, a primary coil connected to said matrix converter for producing an alternating magnetic field in response to receiving the second AC voltage from said matrix converter, a secondary coil in communication with said primary coil for producing an induced AC voltage in response to receiving the alternating magnetic field from said primary coil, a secondary rectifier of the voltage doubling type connected to said secondary coil for rectifying the induced AC voltage from said secondary coil to produce a secondary DC voltage, at least one sensor coupled to said secondary rectifier and in communication with said controller for monitoring the secondary DC voltage from said secondary rectifier and outputting a proportional signal, and said controller configured to control said matrix converter to produce the second AC voltage at a desired level and at a desired operating frequency and maintain the secondary DC voltage at a predetermined level in response to the signal from said sensor.

9. A power transfer system as set forth in claim 8 wherein said matrix converter has a positive primary coil node and a negative primary coil node and defines a first primary node and a second primary node and includes a first bidirectional switching module coupled to said controller and connected between said first primary node and said positive primary coil node and a second bidirectional switching module coupled to said controller and connected between said positive primary coil node and said second primary node and wherein said controller is configured to control said first bidirectional switching module and said second bidirectional switching module of said matrix converter at a predetermined switching frequency to produce the second AC voltage at the desired level and at the desired operating frequency and maintain the secondary DC voltage at the predetermined level.

10. A power transfer system as set forth in claim 9 wherein said desired operating frequency is between 70 and 100 kHz.

11. A power transfer system as set forth in claim 8 wherein said secondary rectifier has a positive secondary coil node and a negative secondary coil node and defines a first secondary node and a second secondary node and includes a first rectifier diode coupled to said secondary coil and connected to said first secondary node and a second rectifier diode connected to said second secondary node and coupled to said secondary coil at said positive secondary coil node and includes a first rectifier capacitor connected between said first secondary node and said negative secondary coil node and a second rectifier capacitor connected between said negative secondary coil node and said second secondary node for rectifying and doubling the induced AC voltage from the secondary coil to produce the secondary DC voltage.

12. A power transfer system as set forth in claim 11 wherein said matrix converter has a positive primary coil node and a negative primary coil node and defines a first primary node and a second primary node and said power transfer system further including a first primary coil tuning capacitor connected between said first primary node and said negative primary coil node and a second primary coil tuning capacitor connected between said second primary node and said negative primary coil node and a secondary coil tuning capacitor connected between said secondary coil and said positive secondary coil node for tuning resonance between said primary coil and said secondary coil.

13. A power transfer system as set forth in claim 8 further including a battery connected to said secondary rectifier for storing the secondary DC voltage from the secondary rectifier.

14. A method of power transfer comprising the steps of:
supplying a first AC voltage with an AC supply,
switching at least one converter switch of a matrix converter at a predetermined switching frequency with a controller,
converting the first AC voltage to a second AC voltage at a desired operating frequency with the matrix converter,
supplying the second AC voltage to a primary coil,
producing an alternating magnetic field in response to the second AC voltage with the primary coil,
producing an induced AC voltage in a secondary coil in response to the alternating magnetic field from the primary coil,
converting the induced AC voltage to a secondary DC voltage with a secondary rectifier,
measuring the secondary DC voltage with a sensor using the controller,
varying the second AC voltage using the controller in response to a signal from the sensor, and
varying the secondary DC voltage.

15. A method of power transfer as set for in claim 14 further including the step of doubling the induced AC voltage from the secondary coil using the secondary rectifier.

16. A method of power transfer as set for in claim 14 further including the step of filtering the AC voltage to remove undesired frequencies.

17. A method of power transfer as set for in claim 14 further including the step of charging a battery using the secondary DC voltage.

* * * * *